(12) United States Patent
Kotlar et al.

(10) Patent No.: US 8,881,815 B2
(45) Date of Patent: Nov. 11, 2014

(54) WELL TREATMENT

(75) Inventors: Hans Kristian Kotlar, Stavanger (NO); Ping Chen, Aberdeen (GB)

(73) Assignee: Statoil Petroleum AS, Stavanger (NO)

( * ) Notice: Subject to any disclaimer, the term of this patent is extended or adjusted under 35 U.S.C. 154(b) by 749 days.

(21) Appl. No.: 11/629,089

(22) PCT Filed: Jun. 17, 2005

(86) PCT No.: PCT/GB2005/002384
§ 371 (c)(1),
(2), (4) Date: Aug. 28, 2008

(87) PCT Pub. No.: WO2005/124097
PCT Pub. Date: Dec. 29, 2005

(65) Prior Publication Data
US 2009/0014178 A1    Jan. 15, 2009

(30) Foreign Application Priority Data
Jun. 17, 2004  (GB) .................................. 0413587.7

(51) Int. Cl.
*E21B 33/13* (2006.01)
*C09K 8/508* (2006.01)
*C09K 8/575* (2006.01)

(52) U.S. Cl.
CPC ............. *C09K 8/5083* (2013.01); *C09K 8/5753* (2013.01)
USPC ....................................... 166/292; 166/305.1

(58) Field of Classification Search
None
See application file for complete search history.

(56) References Cited

U.S. PATENT DOCUMENTS

| 4,366,071 A | * | 12/1982 | McLaughlin et al. | ........ 507/222 |
| 5,038,861 A | | 8/1991 | Shuler | |
| 5,152,902 A | | 10/1992 | Koskan et al. | |
| 5,181,567 A | | 1/1993 | Shuler | |
| 5,211,239 A | | 5/1993 | Thomas et al. | |
| 5,373,086 A | | 12/1994 | Koskan et al. | |
| 5,391,764 A | | 2/1995 | Koskan et al. | |
| 5,893,416 A | | 4/1999 | Read | |
| 5,939,362 A | | 8/1999 | Johnson et al. | |
| 2002/0125199 A1 | | 9/2002 | Sicius et al. | |
| 2004/0244975 A1 | * | 12/2004 | Heier et al. | ................... 166/276 |

FOREIGN PATENT DOCUMENTS

| EP | 0 251 558 A | 1/1998 |
| EP | 1 243 749 A | 9/2002 |
| GB | 2 107 759 A | 5/1983 |
| WO | WO 95/14066 A | 5/1995 |
| WO | WO 02/095187 | 11/2002 |
| WO | WO 02/095187 A2 | 11/2002 |
| WO | WO 2004/011771 A1 | 2/2004 |
| WO | WO 2004/011772 A1 | 2/2004 |

* cited by examiner

*Primary Examiner* — Angela M DiTrani
(74) *Attorney, Agent, or Firm* — Birch, Stewart, Kolasch & Birch, LLP

(57) ABSTRACT

A method for the treatment of a subterranean formation which contains sand particles, said method comprising contacting said formation with a positively charged polymer capable of increasing the residual matrix strength of said sand particles whereby to reduce or prevent their migration while minimizing any decrease in the permeability of said formation. Polymer materials suitable for use in the method of the invention include polyaminoacids, poly (diallyl ammonium salts) and mixtures thereof.

20 Claims, 4 Drawing Sheets

WELL TREATMENT

This invention relates to a method of maintaining or enhancing fluid flow through subterranean formations, especially formations which comprise sand particles. More particularly, the invention relates to the prevention or reduction of particle (e.g. sand) migration in hydrocarbon-producing formations. Yet more particularly, the invention concerns the consolidation or strengthening of unconsolidated sand-like materials (especially sand particles) in subterranean formations.

Hydrocarbons (i.e. oil or gas) are recovered from subterranean formations by drilling a well bore into the formation and extracting the hydrocarbon. One of the factors which affects the rate of hydrocarbon production is the permeability of the formation which depends on the size of its pores and internal capillaries.

Subterranean formations may typically comprise sandstone in which sand particles are closely packed together. These close packed particles form the basic structure of the formation (e.g. the sand particles may comprise greater than 75%, preferably greater than 85%, e.g. greater than 95% by weight of the formation). Also present in subterranean formations are small particulates (so-called "fines") which may comprise sand and other fine particulate matter (e.g. quartz, clays, etc). These "fines" occupy the pores or interstitial spaces formed by the close packing of sand particles.

When recovering hydrocarbons from subterranean formations containing particulate fines, such as silt-sized or smaller particles, these very fine particles have a tendency to be dislodged. Where a large volume of fluid is forced to flow through such a formation, not only these particulates but also sand particles which comprise the structure of the formation, may be transported to the surface and must then be disposed of.

Disposal of large volumes of sand produced from unconsolidated or poorly consolidated formations presents serious problems in terms of the logistics of disposal and also has a huge impact on the economics of the oil and/or gas recovery process. Erosion of downhole equipment (e.g. pipelines, valves, etc) due to the high velocities of particulates, and especially sand particles, can also occur. Routine repair or replacement of, such equipment can only be carried out during periods of shut-down in production which, again, has a significant economic impact on the production process. Fine particulates and, in particular, sand particles can also become lodged in capillaries or a pore throat (i.e. the smaller interstices between the grains of the formation). This at least partially plugs the pore spaces thereby causing a reduction in permeability of the formation and hence a reduction in the rate of hydrocarbon (e.g. oil) production.

Permeability impairment due to the production and movement of fine particulates, and especially sand particles, is a major problem in the operation of hydrocarbon-producing wells, particularly those located within very weak or unconsolidated formations. The result is usually lost production due to plugging of gravel packs, screens, perforations, tubular and surface flow lines or separators. In addition to damaging pumps or other downhole equipment, erosion of casing and surface facilities may also occur. This is a major problem associated with sand mobilization. Indeed, sanding problems can in some cases cause loss or recompletion of a well due to casing and/or hole collapse. As operating conditions become more severe and the costs associated with well failure escalate so the need for effective sand control increases.

A number of methods for controlling sand production have been proposed. These include gravel packing, sand consolidation, critical production rate, oriented/selective perforation, FracPacking, and various combinations of these methods. Such techniques are used in consolidated, poorly consolidated and unconsolidated sand formations.

Another approach to the problem of sanding is to operate the well under conditions not subject to failure. This is commonly termed "Maximum Sand-Free" production. During operation this technique is implemented by gradually increasing the production rate until sand production starts. The rate is then decreased until sanding stops and production is maintained at that level. The difficulty with this approach, however, is that formations tend to become less stable with time. Through pressure depletion and water in-flow, the maximum sand-free rate will usually decrease with time until production becomes uneconomic.

Chemical treatments have also been proposed which involve strengthening a formation by injecting a chemical that bonds fine particulates (e.g. sand grains) together. Chemical agents which have been used in sand consolidation include furaldehydes, phenols and epoxy-based systems; however, these are not considered to be environmentally friendly. A further drawback to these systems is that these have a tendency to block the pores of the formation thereby reducing its permeability to both oil and water. This results in a dramatic reduction in the production rate. There has therefore been a widespread belief amongst those skilled in the art that chemical treatment should be avoided.

There is thus a continuing need for alternative (e.g. improved) well treatments which are able to prevent or reduce the production and movement of fine particles, and especially sand particles, during operation of the well, in particular treatments which minimise the reduction in permeability that can occur when a fluid passes through a formation which comprises sand particles and which may also contain additional moveable fine particulates.

To date, chemical treatments proposed for use in preventing particulate migration, especially those for use in sand consolidation, have focussed on the need to form relatively strong chemical and/or physical bonds between the sand particles. This need arises from the misconception that a certain minimum strength has to be imparted to the formation in order to prevent the movement of fine particulates and sand particles. This, however, results in the formation of stone or stone-like structures in which the interstices or pores between the particles of the formation become blocked and which therefore have low or zero permeability thereby further reducing production levels.

Surprisingly, we have now found that the production of fine particulates and, in particular, sand production can be adequately controlled by the use of chemical agents which impart small incremental forces or a relatively weak residual strength to the formation. Such agents are capable of imparting sufficient resistance against particle (e.g. sand) mobilization but without unduly reducing the permeability of the formation after treatment, e.g. whilst maintaining a high level of permeability. In this way, the production rate can be increased without increasing the production of fine particulates and/or sand particles. Furthermore, since the demand for strength in the particles of the formation matrix is low, this opens up the possibility of using different chemicals for the prevention or reduction of particle migration in rock formations (e.g. for sand consolidation), in addition to the possibility of using chemicals previously proposed for use in preventing particle migration but in much lower amounts. Production costs may therefore be significantly reduced and, if required, sand consolidation may be carried out more frequently thereby still further improving production levels.

Figure 1:
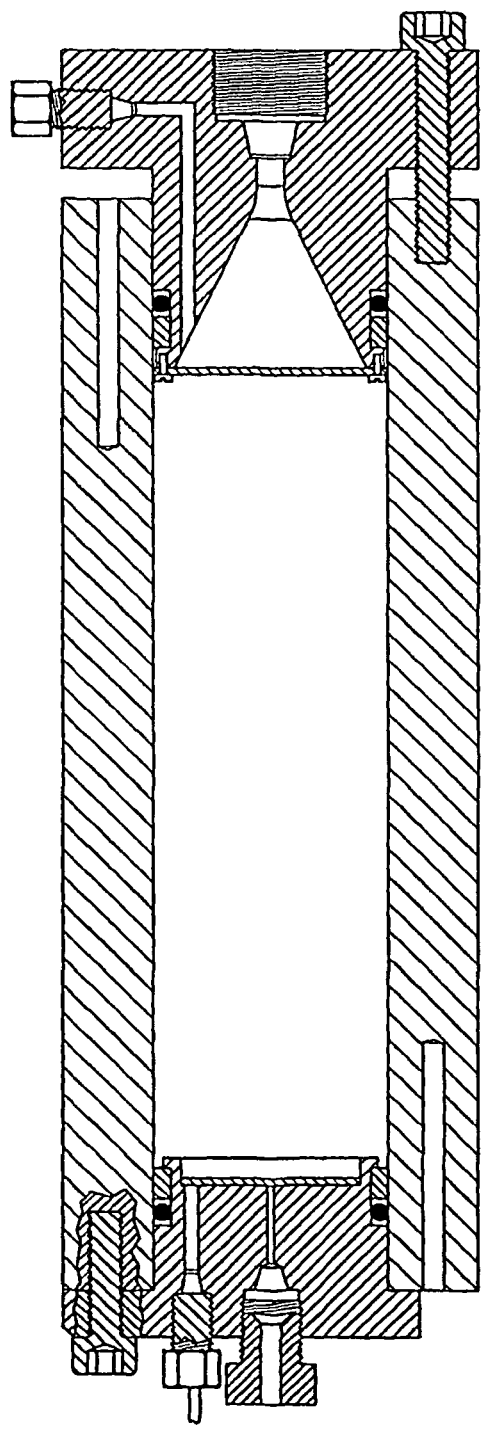
FIG. 1 represents a sand pack holder.

Viewed from one aspect the present invention thus provides a method for the treatment of a subterranean formation which contains sand particles, said method comprising contacting said formation with a material capable of increasing the residual matrix strength of said sand particles whereby to reduce or prevent their migration whilst minimising any decrease in the permeability of said formation. In a preferred method of the invention, said material is also capable of increasing the residual matrix strength of particulate fines whereby to reduce or prevent their migration whilst minimising any decrease in the permeability of the formation.

Viewed from another aspect the invention provides the use for the manufacture of hydrocarbon well treatment compositions (e.g. sand consolidation compositions) of a material capable of increasing the residual matrix strength of sand particles contained within a subterranean formation whereby to reduce or prevent their migration whilst minimising any decrease in the permeability of said formation.

Viewed from a still further aspect the invention comprises a hydrocarbon well treatment composition (e.g. a sand consolidation composition) comprising a carrier liquid containing a material capable of increasing the residual matrix strength of sand particles contained within a subterranean formation whereby to reduce or prevent their migration whilst minimising any decrease in the permeability of said formation.

For the present purposes, the term "sand particles" encompasses any siliceous material which comprises the structure of a subterranean formation. The terms "fines", "fine particulates" and "particulate fines" are intended to encompass any particles present in the pores or interstitial spaces present in the formation. These latter particles typically have a mean particle diameter <50 μm. Typically, these will be small enough to pass through the openings of the smallest sieve commonly available (approx. 37 μm openings). Many different materials can be found in subterranean formations and thus the composition of the fine particulates may vary widely. In general, fines may include quartz and other minerals, clays, siliceous materials such as sand, etc.

The methods and compositions herein described find particular use in treating sandstone formations.

As used herein, the term "residual matrix strength" is a measure of the ability of a particulate matrix to hold together the individual particles under a given set of conditions (e.g. temperature, pressure, fluid flow, etc.). The residual matrix strength of a matrix may be quantified in several ways, e.g. in terms of the applied force, pressure, fluid velocity, etc. required to destroy or "break" the matrix.

Materials suitable for use in accordance with the invention are those which are capable of imparting a relatively weak residual matrix strength to the sand particles contained within a formation, for example a residual matrix strength of the order of 0.1 to 500 bar, preferably 1 to 200 bar, e.g. 0.1 bar.

As used herein, the term "permeability" means the capacity of a porous medium (e.g. the particulate matrix) to transmit a fluid, i.e. the rate of flow of a liquid through a porous material. Permeability is measured using Darcy's Law:

$$Q = k \cdot \Delta P \cdot A / \mu L$$

where
Q=flow rate ($cm^3$/s)
ΔP=pressure drop (atm) across a cylinder having a length, L (cm) and a cross-sectional area A ($cm^2$)
μ=fluid viscosity (cp)
k=permeability (Darcy)

Preferably, the reduction in permeability of the formation following treatment in accordance with the invention will be less than 40%, preferably less than 30%, more preferably less than 20%, e.g. less than 10%. Yet more preferably, the particulate fines will have substantially the same permeability both prior to and following treatment in accordance with the invention.

Particularly preferred for use in the invention are materials which increase the residual matrix strength of the particulates by 20 to 1,000%, preferably 100 to 200% without decreasing the relative permeability of the matrix by more than 50 to 1%, preferably 30 to 1%, e.g. 10 to 1%.

The amount of particulate fines and especially sand particles produced from any given rock formation on exposure to a fluid at a given velocity may be expressed as a percentage of the original mass of the formation. Materials suitable for use in accordance with the invention are those which are capable of minimising the production of particulate fines and especially sand particles, and will generally maintain the level of production of particulates below 10%, e.g. below 8%, at a Darcy flow rate (Darcy velocity) of at least 0.3 cm/s. Materials which are able to keep sand production levels within the range of from 1 to 4%, e.g. 1-2%, at a Darcy velocity of at least 0.3 cm/s are particularly preferred.

The nature and concentration of the agents used in the invention is such that these impart a relatively small increase in the residual matrix strength of the sand particles. For example, it has been found that a rest force roughly equivalent to the capillary forces (capillary tension) in water wetted sand (approx. 1 psi) is sufficient to stop (or at least limit) the mobilization of fine particulates, and especially sand particles. A relatively small increase in the residual matrix strength of sand particles can in turn result in a considerable increase in the Maximum Sand Free Rate (MSR). This has a huge economic impact for those wells where the production rate is dependent on the MSR.

Materials suitable for use in the invention include positively charged agents capable of binding (e.g. cross-linking) fine particulates, and in particular sand particles. Preferably, such materials may comprise positively charged polymers. Without wishing to be bound by theory, it is believed that positively charged polymers have the effect of binding or holding together particles, especially sand particles, for example by providing a link between the individual particles. This binding imparts the necessary residual matrix strength.

Particularly preferred for use in the invention is a positively charged polymer selected from the group consisting of polyaminoacids, poly (diallyl ammonium salts) and mixtures thereof. Poly (diallyl ammonium salts) are especially preferred, in particular poly (diallyldialkyl ammonium salts).

By the term "polyaminoacid" is meant any polymeric material comprised of repeating amino acid units. A preferred example of a polyaminoacid for use in the present invention is polyaspartate (or polyaspartic acid). The polyaspartate may be a copolymer of aspartic acid and other amino acids, e.g. histidine, glycine, alanine, proline, leucine, serine and tyrosine. Copolymers comprising aspartic acid and proline and/or histidine are particularly preferred. In copolymers, preferably at least 30%, more preferably at least 50%, still more preferably at least 70% of the residues in the final polypeptide product are aspartic acid. Still more preferably the polyaspartate is a homopolymer (e.g. at least 80%, preferably at least 90%, still more preferably at least 95 W of the residues in the final polypeptide product are aspartic acid).

Particularly preferably the polyaminoacid (e.g. polyaspartate) has a molecular weight of 2000 to 100,000 more preferably 10,000 to 90,000, e.g. about 50,000.

Polyaminoacids suitable for use in the invention may be made by any conventional procedure known in the art or may be commercially available. Particularly preferred polyaspartates for use in the present invention may be prepared according to the techniques described in WO02/095187 to Statoil ASA, the content of which is incorporated herein by reference. For instance preferred polyaspartates may be prepared according to the procedures described in the Examples of WO02/095187, e.g. in Examples 1 to 3.

Poly (diallyl ammonium salts) for use in the invention are preferably derived from monomers of formula (I):

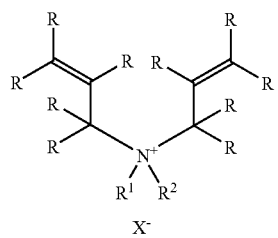

(I)

(wherein
$R^1$ and $R^2$ are each independently hydrogen or organic radicals having from 1 to 20 carbon atoms, preferably 1 to 12 carbon atoms, e.g. 1 to 6 carbon atoms;

each R is independently selected from hydrogen and organic radicals having from 1 to 20 carbon atoms (e.g. 1 to 6 carbon atoms); and X is a counterion, preferably a halogen, e.g. Cl or Br, especially Cl).

In preferred monomers of formula (I), $R^1$ and $R^2$ are each independently a substituted or unsubstituted, preferably unsubstituted, alkyl, alkenyl or aryl group. Particularly preferably, $R^1$ and $R^2$ are each independently an alkyl group, especially an unsubstituted alkyl group. Representative, examples of preferred alkyl groups include methyl, ethyl, propyl, butyl and pentyl. Methyl is particularly preferred. Although $R^1$ and $R^2$ may be different, in preferred monomers of formula (I) $R^1$ and $R^2$ are the same (e.g. $R^1$ and $R^2$ are both methyl).

Preferred monomers of formula (I) are also those wherein each R is a hydrogen atom or a substituted or unsubstituted, preferably unsubstituted, alkyl, alkenyl or aryl group. Particularly preferably each R is a hydrogen atom or an alkyl group (e.g. methyl or ethyl). Although each R may be different, in preferred monomers of formula (I) each R is the same. Still more preferably each R is a hydrogen atom.

In further preferred monomers of formula (I), X is a halogen, especially chlorine.

Particularly preferred poly (diallyl ammonium salts) for use in the invention are those formed from diallyldimethyl ammonium chloride (DADMAC).

Monomers of formula (I) may be polymerised by any conventional polymerisation procedure known in the art (e.g. any conventional radical polymerisation method). Those skilled in the art will be aware of suitable reaction conditions as well as appropriate catalysts and polymerisation initiators. Preferred poly (diallyl ammonium salts) for use in the invention therefore include those that may be obtained by polymerisation (e.g. radical polymerisation) of monomers of formula (I).

Preferred poly (diallyl ammonium salts) for use in the invention are homopolymers. By the term "homopolymer" is meant that the polymer comprises at least 95% wt, preferably at least 99% wt repeating units derived from monomers of formula (I). Particularly preferred poly (diallyl ammonium salts) are homopolymers of diallyldimethyl ammonium chloride. Although homopolymers are preferred, copolymers comprising monomers of formula (I) and other monomers copolymerisable therewith (e.g. acrylate, methacrylate) may also be used in the methods of the present invention. When a copolymer is used, the amount of comonomer is generally less than 20% wt, preferably less than 10 wt, e.g. less than 5% wt of the total weight of monomers.

Particularly preferred poly (diallyl ammonium salts) for use in the present invention comprise repeating units represented by formula (II) and/or formula (III):

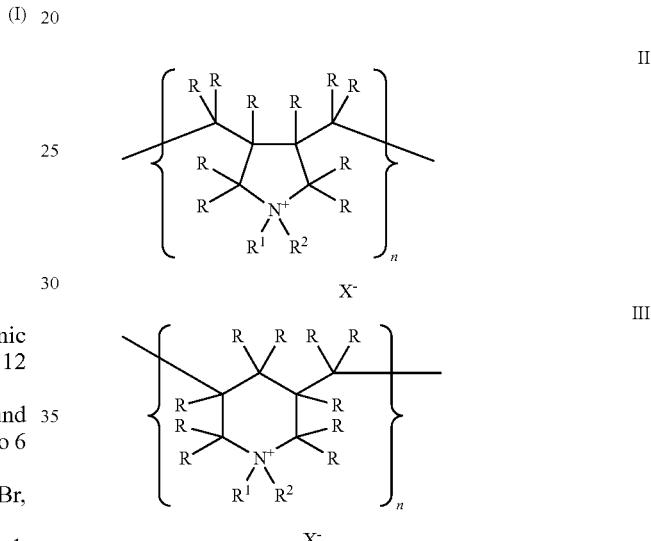

(wherein
$R^1$, $R^2$, R and X are as hereinbefore defined in relation to formula I; and n is 10 to 50,000, preferably 500 to 15,000, more preferably 4,000 to 9,000, e.g. about 5,000).

Polymers comprising repeat units of formula (II) and/or formula (III) may be formed via an alternating intramolecular-intermolecular chain propagation mechanism sometimes called cyclopolymerisation. In this mechanism a 5- or 6-membered ring may be formed in the first step of the polymerisaton (by an intramolecular reaction). The ring then reacts with a further monomer in an intermolecular reaction to extend the length of the polymer chain. Further intramolecular, then intermolecular reactions may then occur.

During the intramolecular reaction step of the polymerisation, the new bond may be formed between the terminal carbon atom of one allyl group (i.e. at $=N-CR_2-CR=CR_2$) and the central carbon atom of the second allyl group (i.e. at $=N-CR_2-\underline{CR}=CR_2$). This reaction yields a 6-membered ring (i.e. forms a repeat unit of formula (III)). Alternatively, the new bond may be formed between the central carbons atom of both allyl groups. This reaction yields a 5-membered ring (i.e. forms a repeat unit of formula (II)).

The poly (diallyl ammonium salts) for use in the invention may comprise any ratio of repeat units of formulae (II) and (III). For instance, the ratio of (II):(III) may be in the range 99:1 to 1:99. More preferably the ratio of (II):(III) is in the range 98:2 to 50:50, e.g. at least 95:5. Still more preferably the poly (diallyl ammonium salt) for use in the invention is substantially free of repeat units of formula (III) (e.g. the polymer comprises less than 2% wt repeating units of formula (III)). Poly (diallyl ammonium salts) which consist essentially of repeat units of formula (II) are particularly preferred.

Preferably the poly (diallyl ammonium salts) for use in the present invention are substantially linear.

For example, it is preferred that less than 10%, more preferably less than 5% cross linking is present. Still more preferably the poly (diallyl ammonium salts) for use in the present invention are water-soluble.

The molecular weight of the poly (diallyl ammonium salts) for use in the present invention is preferably in the range 1,000 to 5,000,000, more preferably 5,000 to 2,500,000, still more preferably 60,000 to 1,500,000 e.g. 500,000 to 1,000,000. Whilst polymers having a molecular weight of around 1,000,000 or more may impart a greater residual matrix strength than lower molecular weight polymers, those having a molecular weight around 500,000 or less may be more environmentally friendly.

A particularly preferred poly (diallyl ammonium salt) for use in the present invention is poly diallyldimethyl ammonium chloride (pDADMAC) (MW 100,000-1,000,000 which is commercially available from Chengdu Cation Chemistry Company, China). This polymer may be used in its commercially available form or optionally may be dialysed prior to use to remove any low molecular weight compounds.

Whilst not wishing to be bound by theory, it is believed that the multiple positive charges of the polymers hereinbefore described offer the necessary adsorption property to negatively charged particulates, and especially sand grains, such that these remain bound to one another during production of hydrocarbon from a subterranean formation. More specifically it is thought that, by virtue of its length and multiple positive charges, the polymer may interact electrostatically with a number of different particles of the formation thereby holding or binding them together. In so doing the polymer chain is likely to span the interstitial space between sand particles of the formation. The result is simply the formation of a "mesh like" or "net-like" structure which does not impair fluid flow. Hence the permeability of a subterranean formation treated according to the method the present invention is largely unchanged after treatment.

The amount of material to be used to prevent particle migration, e.g. sand consolidation, will vary widely depending on factors such as the nature of the material used, the nature (e.g. permeability, temperature, etc.) of the rock formation and so on. The average particle/grain size of the particles will, for example, influence the strength of the matrix and thus the amount of chemical agent needed to prevent or reduce particle migration. In general, the amount of material used will be sufficient to maintain the rate of flow of liquid through the formation following treatment and appropriate amounts may readily be determined by those skilled in the art. Typically, poly (diallyl ammonium salts), e.g. poly (diallyldimethyl ammonium chloride), may be employed in an amount in the range of from 0.05 to 10 $m^3$, preferably 0.075 to 3 $m^3$, more preferably 0.1 to 0.5 $m^3$, e.g. about 0.145 $m^3$ per $m^3$ of formation (based on a 10% solution of the polymer, e.g. diallyldimethyl ammonium chloride).

Preferably, the amount of material to be used will be sufficient to cover a substantial proportion of the sand particles comprising the formation. More preferably sufficient material is supplied to cover 10 to 95% of the particles, more preferably 40 to 80%, still more preferably 50 to 70%. This amount of material is capable of forming the above-described mesh-like or net-like structure between particles throughout the formation. This contrasts with many conventional procedures that either seek to completely fill the interstitial spaces present between particles of the formation or to solely treat fines, e.g. clays, which are present within the structure of the formation. In general about 50 to 150 liters of material per $m^3$ of the formation will be employed.

The polymers for use in the invention are preferably applied as a solution or dispersion (e.g. a solution) in a liquid carrier. The liquid carrier may be aqueous or non-aqueous. Suitable non-aqueous carriers comprise a non-aqueous organic liquid, e.g. a hydrocarbon or hydrocarbon mixture, typically a $C_3$ to $C_{15}$ hydrocarbon, or oil, e.g. crude oil. Other suitable carrier liquids include aromatic hydrocarbons such as naptha and diesel. More preferably the non-aqueous carrier is an alkanol, particularly preferably a polyol (e.g. a glycol). Particularly preferred glycols include those of the formula $(CH_2)_n(OH)$, wherein n is 2 to 6 (e.g. ethylene glycol). Still more preferably the liquid carrier is aqueous (e.g. sea water)

Preferably, the concentration of the well treatment agent in the carrier liquid will be in the range of 0.1 to 50% w/v (e.g. 1 to 10% w/v or about 5% w/v), more preferably 11 to 30% w/v, still more preferably 15 to 25% w/v. Typically about 300-3000 liters of carrier per $m^3$ of formation to be treated will be used.

Where the material is a poly (diallyl ammonium salt) such as poly (diallyldimethyl ammonium chloride), it is preferred that the dispersion has a pH less than 7 (e.g. the dispersion may have a pH of 4-6).

The liquid carrier may also contain other additives known in the art for use in well treatment. Such additives include surfactants, thickeners, diversion agents, scale inhibitors, corrosion inhibitors, pH buffers and catalysts. Preferably the liquid carrier will not contain (i.e. be substantially free from) at least one of: (i) a scale inhibitor, (ii) a corrosion inhibitor and (iii) an organosilane. More preferably the liquid carrier will not contain either: (i) and (ii) or (i) and (iii). Particularly preferably the liquid carrier will not contain (i), (ii) or (iii). Still more preferably the liquid carrier consists essentially of an aqueous solution of a material capable of increasing the residual matrix strength (e.g. a polymer as hereinbefore described) of sand particles in a formation.

It is envisaged that treatment with a polymer as herein described could be at any stage in hydrocarbon production, i.e. before and/or after hydrocarbon production (i.e. extraction of oil or gas from the well) has begun. Preferably, the treatment will be prior to hydrocarbon production in order to mitigate against potential particulate migration, especially sand particle migration.

The method of the invention may be carried out on a subterranean formation without any pre-flush. In some cases, however, it may be preferable to treat the formation with a pre-flush composition prior to treatment with the polymer material capable of increasing the residual matrix strength of the formation. The purpose of the pre-flush may be, for example, to wet the surface of the formation (e.g. if the formation is oil-rich). The pre-flush composition may therefore comprise a surfactant. When a formation pre-treated with such a pre-flush is subsequently treated with, for example, a polymer as hereinbefore described the interaction between the surface of the formation and the polymer may be enhanced.

In a particularly preferred method of the invention a scale inhibitor is not added into the formation either prior to or at the same time as the polymer material herein described. In a further preferred method a corrosion inhibitor is not added into the formation at the same time as the polymer material herein described. In a yet further preferred method of the invention an organosilane is not added into the formation either prior to or at the same time as the polymer material capable of increasing the residual matrix strength of the formation.

An after-flush or over-flush composition may also be optionally used in the method of the invention. An after-flush is typically done following addition of the material (e.g. a polymer as hereinbefore described) capable of increasing the residual matrix strength of the formation. It serves to displace any unreacted material out of the well-bore. Any convenient aqueous or non-aqueous liquid may be used.

Treatment is conducted by injecting the composition through a well into the formation, generally employing pressures sufficient to penetrate the formation. Treatment times or period of shut-in will depend on a number of factors including the nature of the formation and the degree of consolidation required, the nature and concentration of the chemical employed, the depth of perforations, etc. Typical shut-in times may be determined by those skilled in the art and will generally range from 2 to 10 hours, preferably from 3 to 8 hours, e.g. about 4 to 6 hours.

Any conventional treatment methods may be used to supply the materials to the production well. Such methods will include bull-heading, coil tubing and zonal isolation with packers. Of these methods, bull-heading will generally be preferred. This is in contrast to prior art methods where treatment chemicals are generally placed at various points in the formation, e.g. placed by coiled tubing to spot this at the desired site. This is a more costly operation to perform. An advantage of bull-heading is that the whole well is treated and at relatively low cost. Bull-heading can be used for treatment of both vertical and horizontal wells and treatment can be effected during short production intervals. Suitable injection flow rates may be readily determined by those skilled in the art, however preferred flow rates may lie in the range 2500 to 3000 liters/min. In general, the injection flow rate will not be lower than about 500 liters/min.

Coiled tubing (CT) methods are less desirable for economic reasons but may nevertheless be successfully used to supply the materials to the well. Such methods are generally more appropriate for treating long horizontal sections of the well. Suitable CT methods include those conventionally used in the field, e.g. roto pulse method, concentric coiled tubing, etc.

The materials herein described may be used in treating hydrocarbon wells both prior to and during production of sand, i.e. for wells that already produce sand (post-failure) thereby effectively prolonging the lifetime of the well and those that potentially may produce sand (pre-failure). For example, potentially weak formations (e.g. those having a potential for sand production under the so-called TCS 2 test, i.e. at the borderline of the 217 Bar at 2 MPa confining pressure limit) could be treated in advance, i.e. on completion. In this way, the need for complex sand protection systems for completion of the well is avoided. Instead, much simpler and thus more cost effective sand protection systems can be used for completion, e.g. simple sand screens.

For existing wells where production is restricted by Maximum Sand Free rate, treatment in accordance with the invention enables the use of much higher flow rates. A higher draw down can therefore be employed resulting in an increase in the level of hydrocarbon production. In reservoirs where a depletion strategy might be used to permit more complete recovery of hydrocarbon, treated wells can tolerate a much higher differential pressure (i.e. higher draw down) without sand production.

The process of the invention is particularly effective in increasing tail-end production in more mature wells where the rate of production of hydrocarbon is limited by the Maximum Sand Free rate and high water cuts. Hitherto, such wells would tend to be shut down once the production rate reaches a cut-off level and thus becomes uneconomic. However, by treating these wells in accordance with the method herein described the formation is stabilised to the extent that this can tolerate a higher differential pressure without sanding problems. This enables a sufficient boost in the production rate of hydrocarbon (e.g. an increase of as little as 50-100 $m^3$ oil per day) that the well again becomes viable. In this way, the lifetime of the well can be prolonged by several years. By boosting the production rate from existing wells, the huge costs involved in opening a new formation are avoided, or at least delayed.

The treatment methods herein described are such that these may be repeated as necessary in order to prevent particulate migration (e.g. to maintain sand-free production) at minimum cost. For example, treatment can be repeated at various intervals in order to maintain sand-free production throughout the lifetime of the well. Alternatively, if a SMART well concept is employed, treatment can be effected at each stage of opening of a new section or interval in the formation. With each opening the well bore may be treated as herein described prior to hydrocarbon production.

Other conventional well treatments such as stimulation treatment, hydraulic fracture treatment and scale reduction treatment may be used in conjunction with the method of the invention. These may precede or follow the method of the invention. Preferably, however, the well is ready to be put back onto production immediately after the method of the invention.

The invention will now be described further with reference to the following non-limiting Example:

EXAMPLE 1

Poly (diallyldimethylammonium chloride) (available from Chengdu Cation Chemistry Company, China) was tested for its ability to consolidate sand using a sand pack holder as illustrated in attached FIG. 1 having the following dimensions: 209 mm (length)×65 mm (diameter) and a total sand volume of 157 $cm^3$. The cylindrical sand pack holder can be split into two parts so that it is then possible to remove a partly consolidated sand pack, e.g. for strength testing, without destroying it. The sand pack holder was connected with differential pressure transducers and placed inside a heating cabinet. Two high-rate pumps were used to generate flow velocities high enough to generate sand production, whereas a pulse free pump was used for permeability measurements. A controller was connected to the two high-rate pumps that stepped up the rate according to a pre-programmed procedure.

Experimental Procedure:
1. The sand pack holder is filled with unconsolidated sand (standardised Baskarp sand).
2. Brine is injected into the sand under vacuum.
3. Permeability at $S_w=1$ is measured.
4. Inject chemical and shut-in for a desired period of time and at a desired temperature.
5. The chemical is flushed out using brine.
6. Permeability after treatment at $S_w=1$ is measured.

7. Sand production is measured using a pre-programmed procedure.

During sand production, the rate of fluid flow was stepped up from 0 to 100 ml/min, each rate step lasting for 30 seconds. The sand was produced into a beaker with overrun for the fluid. At the end of the experiment the sand was collected using a 0.45 μm filter. The sand was then dried at 50° C. and weighed.

Reference experiments were performed in the exact same manner, except that no chemical was injected into the sand pack. Instead, brine was injected.

Chemical Tested:

Poly (diallyldimethylammonium chloride (10% solution in 1M NaCl)

Figure 2:
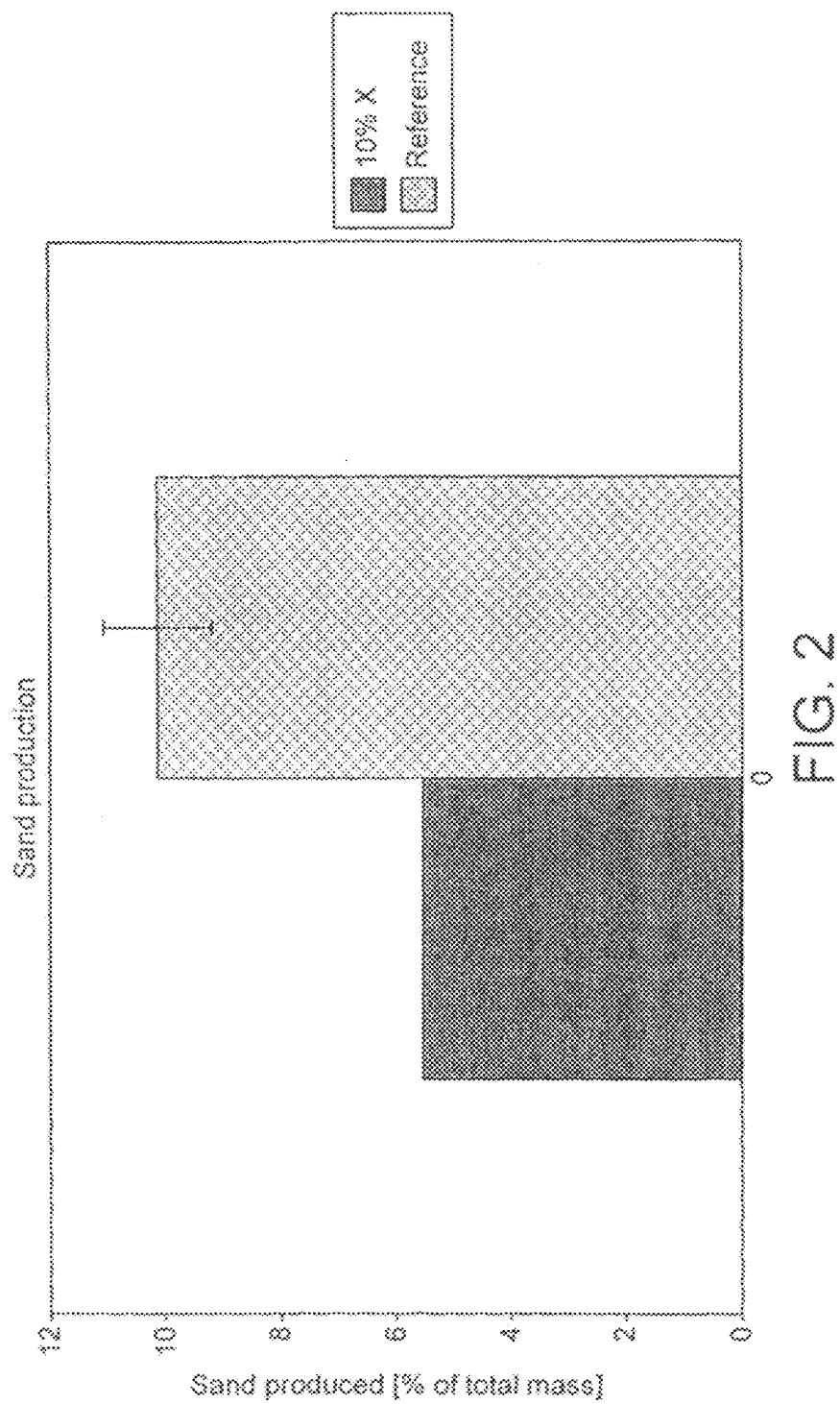
FIG. 2 is a graph of the amount of sand produced as a percentage of the total mass of sand in the sand pack holder.
Figure 3:
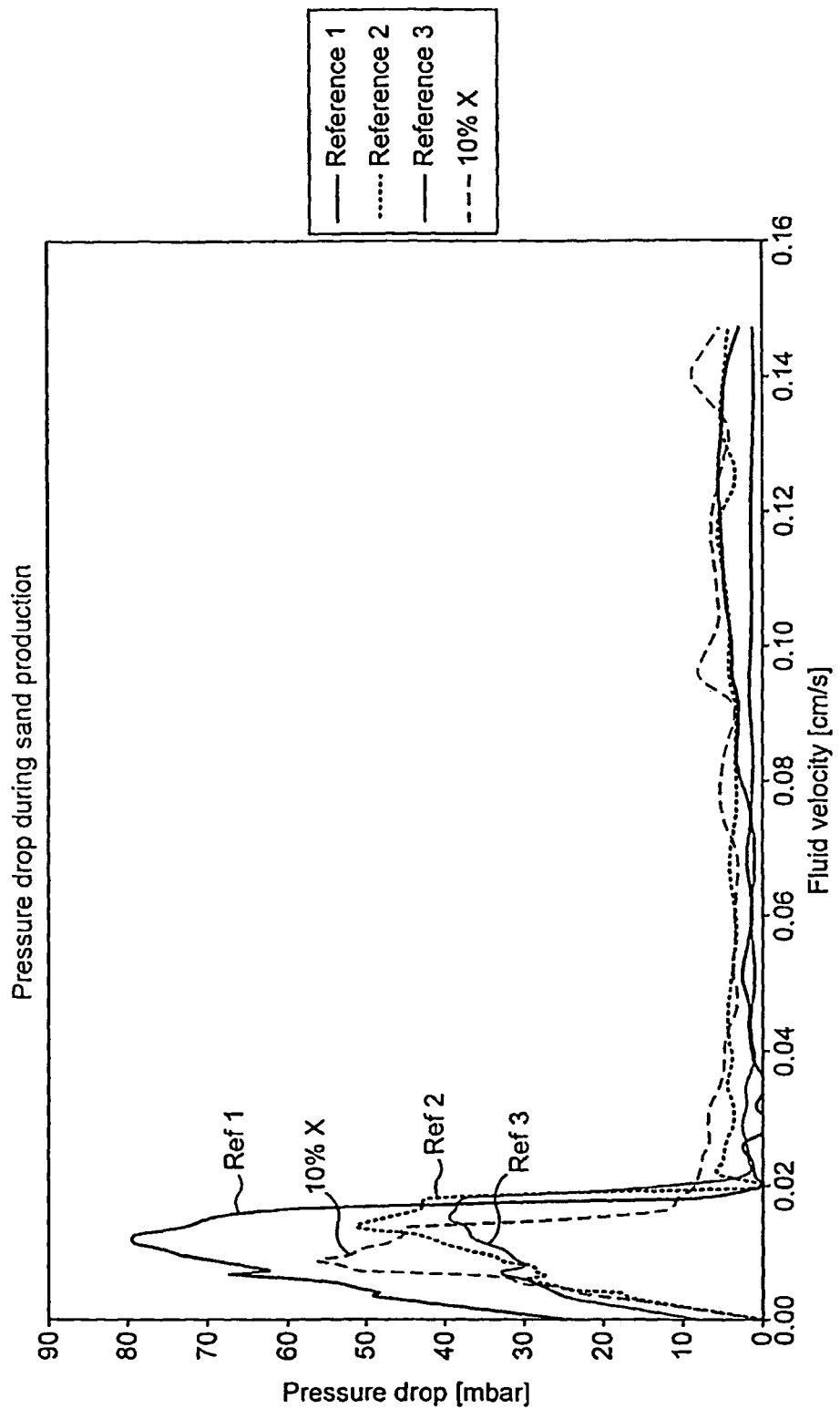
FIG. 3 shows how the pressure drop across the sand pack varied during sand production
Figure 4:
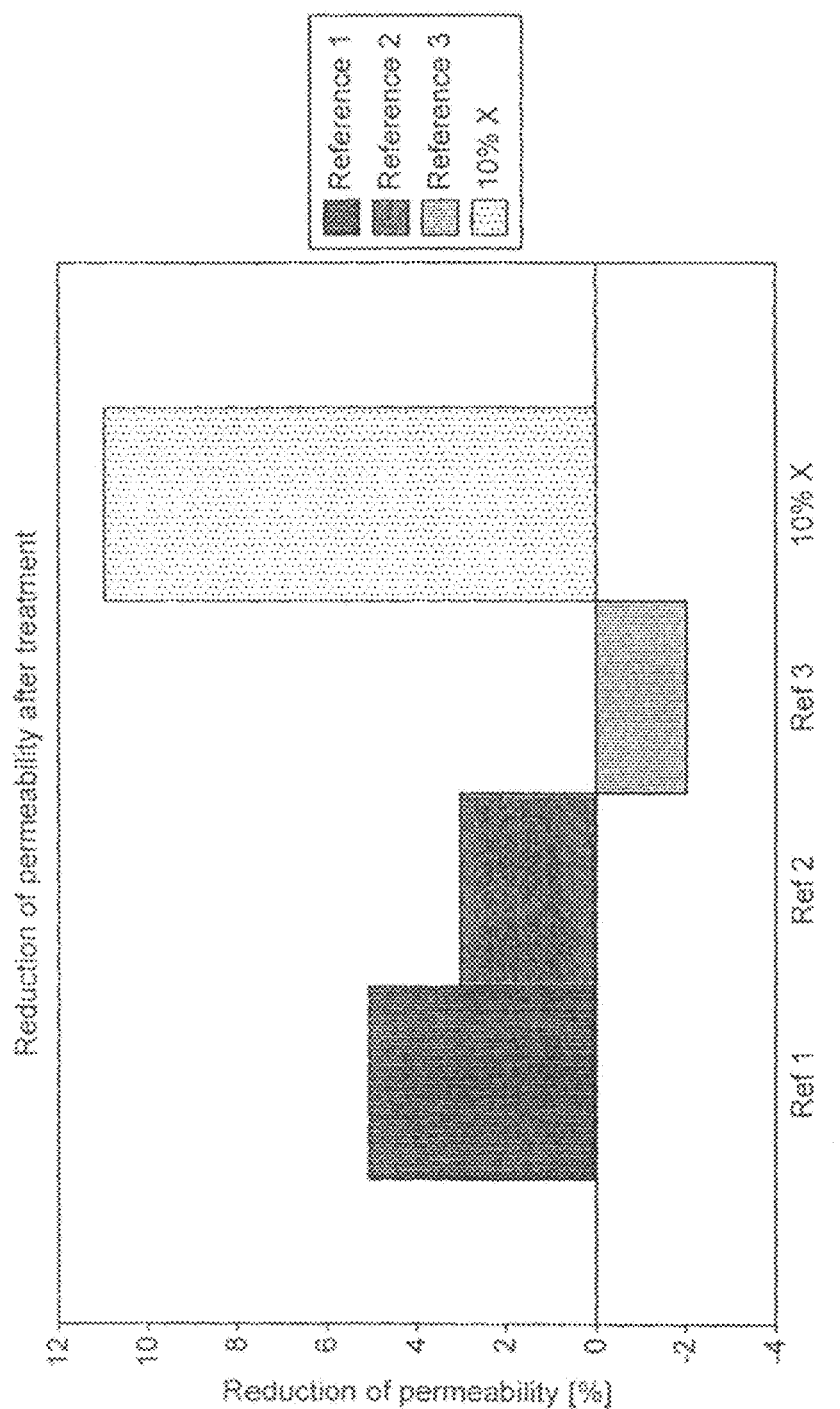
FIG. 4 shows the percentage reduction in permeability after treatment compared to before treatment.

Results:

In FIG. 2 the amount of sand produced is displayed as a percentage of the total mass of sand in the sand pack holder. FIG. 3 shows how the pressure drop across the sand pack varied during sand production. FIG. 4 shows the percentage reduction in permeability after treatment compared to before treatment. X denotes diallyldimethyl ammonium chloride.

Discussion:

FIG. 2 shows that poly (diallyldimethylammonium chloride) is capable of reducing sand production compared to the reference.

The invention claimed is:

1. A method for the consolidation of a subterranean formation which comprises sand particles, said method comprising contacting said formation with an effective amount of a positively charged polymer to increase residual matrix strength of said formation so as to reduce or prevent migration of said particles while minimizing any decrease in the permeability of said formation, wherein
said polymer is selected from the group consisting of polyaminoacids, poly(diallyl ammonium salts) and mixtures thereof and is contacted with said formation as a dispersion or solution in a liquid carrier at a concentration of 30-50% weight/volume;
said poly(dially ammonium salts) polymer has a molecular weight of from 1,000 to 5,000,000; and
said polymer is injected through a well into the formation and said polymer is shut in the formation for a treatment time sufficient to cross-link said sand particles, wherein time sufficient to cross-link is 2-10 hours.

2. The method of claim 1 wherein said polymer is a poly (diallyl ammonium salt).

3. The method of claim 2 wherein said poly (diallyl ammonium salt) is formed from monomers of formula (I):

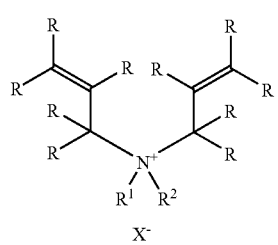

(I)

wherein
R$^1$ and R$^2$ are each independently hydrogen or organic radicals having from 1 to 20 carbon atoms;
each R is independently selected from hydrogen and organic radicals having from 1 to 20 carbon atoms; and
X is a counterion.

4. The method of claim 3 wherein R$^1$ and R$^2$ are each independently hydrogen or organic radicals having from 1 to 12 carbon atoms; each R is independently selected from hydrogen and organic radicals having from 1 to 6 carbon atoms and where in X is a counterion which is a halogen ion.

5. The method of claim 2 wherein said poly (diallyl ammonium salt) comprises repeating units represented by formula (II)$^-$ and/or formula (III):

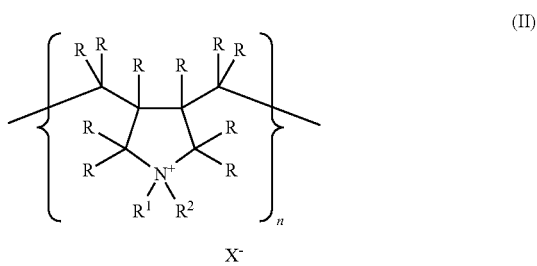

(II)

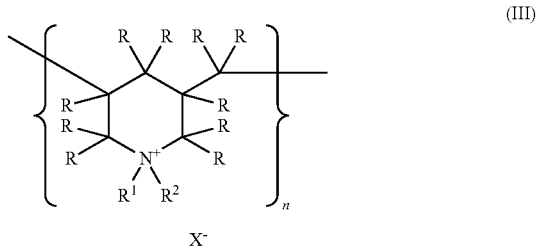

(III)

wherein
R$^1$, R$^2$, and R are each independently hydrogen or organic radicals having from 1 to 20 carbon atoms; and X is a counterion; and n is 10 to 50,000.

6. The method of claim 5 wherein said poly (diallyl ammonium salt) comprises repeating units of formulae (II) and (III) in a ratio of 99:1 to 50:50.

7. The method of claim 6 wherein the ratio is at least 95:5.

8. The method of claim 5 wherein n is 4,000 to 9,000.

9. The method of claim 2 wherein said poly (diallyl ammonium salt) is substantially linear.

10. The method of claim 2 wherein said formation is a sandstone formation and the poly(diallyl ammonium salt) is poly diallyldimethyl ammonium chloride with a molecular weight of from 100,000 to 1,000,000.

11. The method of claim 2 wherein said poly (diallyl ammonium salt) is formed from diallyldimethyl ammonium chloride (DADMAC).

12. The method of claim 1 wherein said polymer is a polyaminoacid.

13. The method of claim 12 wherein said polyaminoacid has a molecular weight of 2000 to 100,000.

14. The method of claim 12 wherein the polyaminoacid is polyaspartate.

15. The method of claim 14 wherein said polyaspartate has a molecular weight of 2,000 to 100,000.

16. The method of claim 1 wherein said carrier is aqueous.

17. The method of claim 16, wherein the carrier is sea water.

18. The method of claim 1 wherein the concentration of said positively charged polymer is 30% weight/volume.

19. The method of claim 1, wherein the molecular weight of the poly(diallyl ammonium salt) is 100,000 to 1,500,000.

20. The method of claim 1, wherein the residual matrix strength is increased by 100 to 200% without decreasing the permeability of the matrix by more than 10 to 1%.

* * * * *